June 14, 1960  R. T. HENDRICKSON  2,940,771
RESILIENT AXLE SUSPENSION FOR VEHICLES
Filed Dec. 15, 1955  2 Sheets-Sheet 1
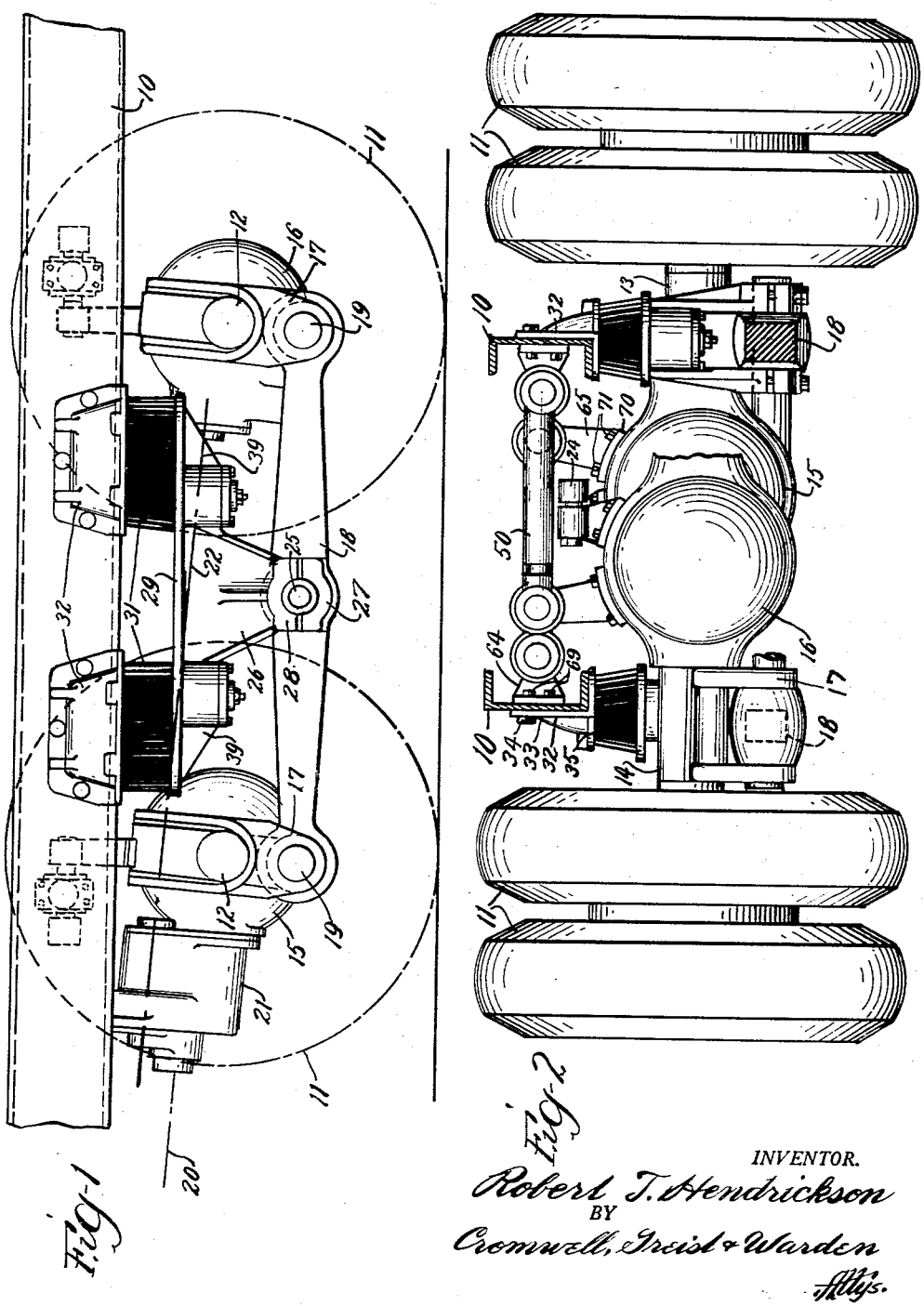
INVENTOR.
Robert T. Hendrickson
BY
Cromwell, Greist & Warden
Attys.

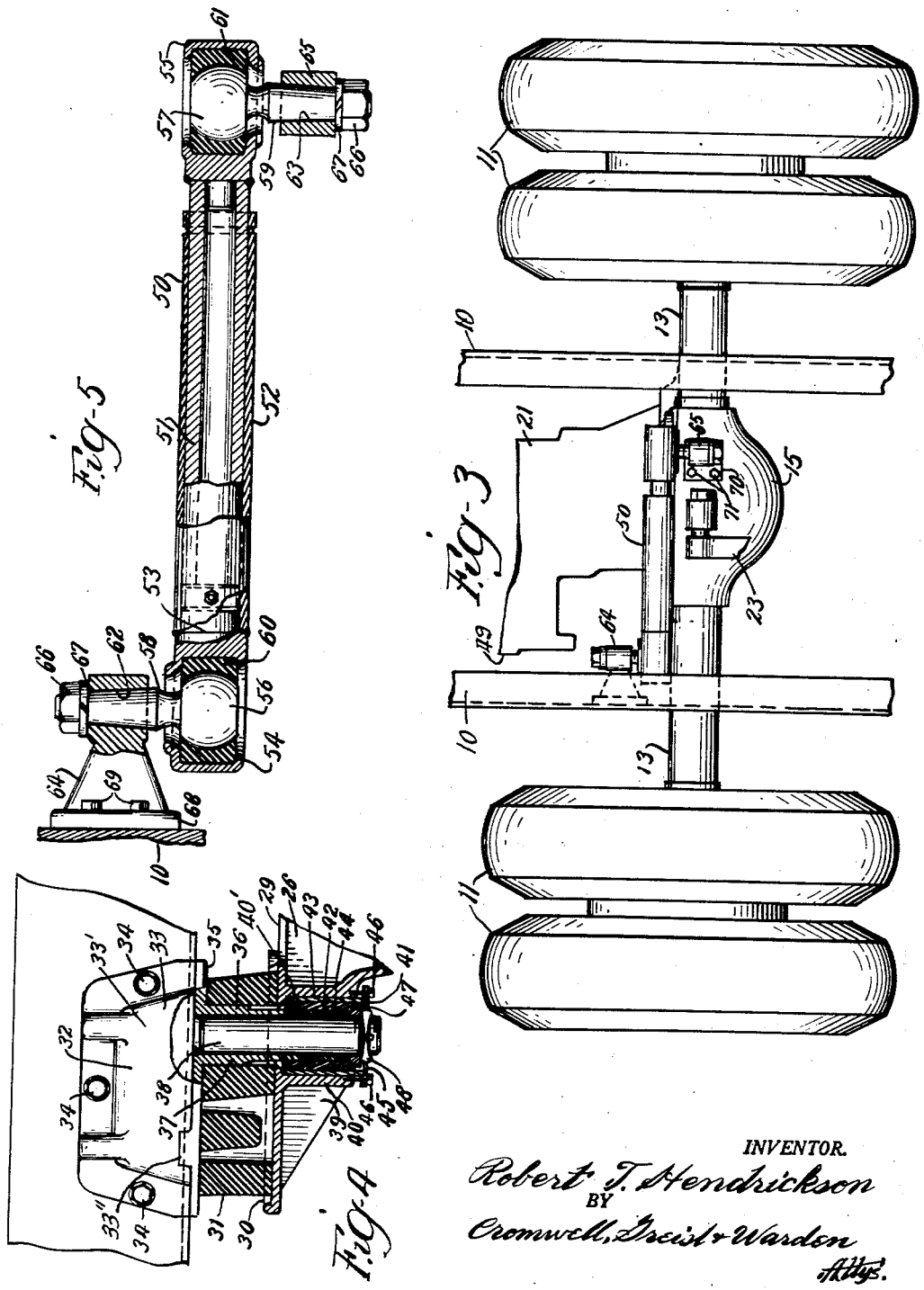

United States Patent Office 2,940,771
Patented June 14, 1960

2,940,771
RESILIENT AXLE SUSPENSION FOR VEHICLES

Robert T. Hendrickson, Hinsdale, Ill., assignor to Hendrickson Manufacturing Co., Lyons, Ill., a corporation of Illinois Filed Dec. 15, 1955, Ser. No. 553,223

1 Claim. (Cl. 280—104.5)

This invention relates generally to improvements and innovations in torque rods and the use thereof in resilient suspensions for vehicles.

It is a general object of the invention to provide a mechanism for resiliently suspending the frame of a vehicle from the axles wherein the movement of the frame relative to the axles in a sidewise direction is held within a predetermined limit.

Axle suspensions for vehicles have been previously proposed wherein components formed of rubber or rubber-like material are employed to resiliently support and connect vehicle frames and bodies on and to single axles or multiple axle units. Such components have been arranged to support and absorb the vertical and horizontal stresses without frictional interengagement of hard surfaces between which wear can take place. A resilient suspension of this type is disclosed in my Patent No. 2,689,136. While such suspensions have proven successful, it has been found that under certain driving conditions some undesirable contact may occur between the frame and portions of the driving mechanism carried by the axle which are relatively close to the frame. The present invention is incorporated, for the purpose of illustration, in a suspension of this character and its principal object is to provide a suspension wherein such contact between the frame and driving mechanism cannot occur.

A more specific object of the invention is to provide, in combination with a suspension for resiliently supporting a vehicle frame on an axle, an extensible rod element which does not restrain the movement of the axle during normal operation of the vehicle under ordinary driving conditons, but which operates to limit the side sway or sidewise movement of the axle when, under an extreme twist, there is a tendency for the frame to swing relative to the axle an undesirable amount resulting in interference between the frame and portions of the driving mechanism carried by the axle, such as the power divider in the tandem axle unit.

A still more specific object of the invention is to provide an improved springless suspension for resiliently mounting or supporting a vehicle frame on either single or tandem axles, wherein resilient rubber-like cushions absorb primarily vertical load stresses while horizontal stresses such as driving and braking stresses are primarily absorbed by longitudinally spaced vertical pins rigidly attached to the vehicle frame in a front-to-rear direction and engaging with vertical sleeves formed of resilient rubber-like material which are mounted within housings supported from a single axle or tandem axles, as the case may be, and wherein the amount of movement of the axles sideways is limited by a specially constructed rod element which does not restrain the normal movement of the axles until the suspension is subject to extreme twist.

It is another object of the invention to provide a rod element which is particularly adapted for use in connection with a resilient axle suspension to provide a limit for the side-sway which is sometimes encountered under certain driving conditions such as when the vehicle is rounding a curve at a speed which subjects the suspension to an extreme twist.

It is still another object of the invention to provide a rod element for limiting the sideways movement of a vehicle frame which is resiliently supported by a springless axle suspension on a tandem axle unit which rod element comprises a pair of telescoping members connected in pivoted relation to the axle and the frame respectively and having a limited telescoping movement.

These and other objects and advantages of the invention will be apparent from a consideration of the mechanism which is shown by way of illustration in the accompanying drawings, wherein:

Fig. 1 is a side elevation showing one side of a tandem rear axle suspension unit embodying therein the invention;

Fig. 2 is a rear elevation partly in section of the unit shown in Fig. 1, certain parts being omitted or broken away in order to show the construction of the resilient suspension;

Fig. 3 is a fragmentary top plan view showing the front half of the unit in Fig. 1;

Fig. 4 is a fragmentary side elevational view, partly in vertical section, and on an enlarged scale, showing details of one of the resilient suspensions connecting the frame with the side beam saddle in Fig. 1; and Fig. 5 is a view partly in elevation and partly in vertical section of the torque rod and its connecting brackets.

Referring to the drawings the invention is illustrated as embodied in a vehicle construction of the multiple wheel or tandem axle type commonly used on trucks and trailers. The vehicle frame includes a pair of longitudinally extending laterally spaced channel beams or members 10 which are in parallel relation with their open sides facing inwardly and opposite each other.

The frame members 10 are supported by a tandem axle unit which includes pairs of dual wheels 11 mounted on the opposite ends of two longitudinally spaced parallel axles 12. The ends of the axles 12 pass through front and rear axle housings 13 and 14, respectively. Differential housings 15 and 16 are located between the respective axle housings 13—13 and 14—14, which may be integrally formed therewith. The outer ends of each of the axle housings 13 and 14 are provided with hangers 17 (Fig. 1) which are welded thereon and which have their bottom ends bifurcated so that they straddle the eyes integrally formed on each end of a walking beam 18. The ends of the walking beam 18 are pivotally connected to the respective hangers 17 by pins 19.

As shown in the drawings each of the axles 12 is driven. Power is delivered to the unit by means of a propeller shaft indicated by the line 20 to a gear box 21 attached to the front differential housing 15. The front axle is driven from the gear box 21 through a known differential gear unit and power is delivered from the gear box 21 to the rear axle 12 by means of a drive shaft indicated by the line 22 which leads into the rear differential housing 16. The differential housings 15 and 16 are held in proper angular position by means of rigid torque rods 23 and 24, respectively (Figs. 2 and 3) each of which extends in a generally longitudinal direction with one end thereof pivotally secured, by a suitable bracket, to a housing and the other end secured in a like manner to a cross brace or other relatively fixed frame member. The walking beams 18 are pivotally connected intermediate their ends to opposite ends of a cross shaft 25 which is in turn pivotally connected at each end with a saddle 26.

Each saddle 26 is provided with a removable bottom bearing half 27 which mates with an upper bearing half 28 integrally formed as part of the saddle 26. The mating bearing halves 27 and 28 provide journal bearings by which the saddles are pivotally mounted on opposite ends of the cross shaft 25, the latter passing through the middle of each of the walking beams 18 and extending across the unit so that one shaft serves both walking beams 18.

The top of each saddle 26 is provided with an integrally formed horizontal flat plate 29 which extends longitudinally of the vehicle beneath the lower flanges of the vehicle side frame rails or channel members 10. The top plate 29 is provided at its opposite ends with upstanding marginal flanges 30 (Fig. 4) forming upwardly opening relatively shallow recesses for receiving the bottom faces of a pair of resilient cushion forming members or blocks 31 which resiliently connect the saddle 26 with the side frame rail 10 at longitudinally spaced points along the same. These blocks 31 may be formed, of course, as a one-piece member.

The cushion members or blocks 31 are formed of rubber or other rubber-like resilient material and are of substantial depth. They extend between the upper face or platform surface 29 of the saddle 26 and a pair of bracket fixtures 32 which connect the same to the vehicle side rail 10. The bracket fixtures 32 (Figs. 2 and 4) each have an upstanding or vertical plate portion 33 which is rigidly secured to the outer face or vertical side of the channel 10 by bolts 34 (or rivets or like fastening means). Each bracket fixture 32 has a bottom horizontal flange or plate portion 35 which has its bottom surface engaged with the top surface of the associated cushion member 31. The bottom flange 35 has integrally formed therewith a downwardly extending sleeve formation 36 which is adapted to extend through an aperture 37 in the cushion member 31 and which forms a socket for the upper end of a pin 38, the latter projecting downwardly through an aperture in the platform surface 29 of the saddle member 26. The brackets 32 are reinforced and braced by integrally formed slanted vertical wall portions 33' and bosses 33".

Each saddle 26 is provided at the opposite ends of the upper platform 29 with depending central gussets 39 and a pair of integrally formed depending cylindrical housings 40 in which the downwardly projecting pins 38 are received. Resilient sleeve inserts 41 are interposed between the pins 38 and the inner walls of the depending housings 40. The resilient sleeve inserts 41, which are provided for absorbing horizontal stresses, comprise inner and outer metal sleeve elements 42 and 43, respectively, between which is located a sleeve element 44 formed of a rubber-like material such as natural rubber, neoprene or Butyl-rubber. The inner sleeve element 42 is somewhat shorter than the outer sleeve element 43. The outer sleeve element 43 is of a size to permit it to slide into the housing 40 and the inner sleeve element 42 is of the proper size to fit closely over the lower end of the pin 38. The outer sleeve element 43 abuts at its inner end against an internal shoulder 40' in the housing 40 and the entire insert 41 is secured in the housing by means of a clamp ring 45 and fastening bolts 46. The inner sleeve element 42 abuts against the lower edge of the depending sleeve 36 at its inner or upper end and the pin 38 is held in the sleeve insert or bushing 41 by a retainer ring 47 which is slipped over the bottom end of the pin 38 and held in place by means of the nut 48. The structure and operation of the resilient suspension preferably corresponds in detail to that set out in my Patent No. 2,689,136.

The resilient cushioning members 31 are capable of absorbing all the usual stresses due primarily to the weight of the frame and the load while the horizontal and driving and braking stresses are primarily absorbed by the interengagement of the lower ends of the depending vertical pins 38 against the interior of the resilient sleeve bushings or inserts 41. However, under certain driving conditions where due to unusual road conditions and/or unusually heavy or unevenly distributed load, the resilient cushioning members and the associated connecting elements may be subjected to excessive stresses with the result that greater than normal sidesway or twisting occurs and there is undesirable contact between portions of the vehicle frame structure and the driving structure carried by the axles 12, such as, at the point 49 on the differential housing 21 which is normally in close proximity to the side frame channel 10.

In order to insure that sidewise sway due to the resilient cushioning effect of the members 31 and 41 does not exceed a predetermined amount which would permit contact between the vehicle frame structure and the driving structure carried on the axles 12 which is in closest proximity, specially designed rod elements 50 are provided which extend transversely of the frame and are connected between the respective differential housings 15 and 16 and the side frame members 10. Each rod element 50 comprises a pair of telescoping inner and outer tubular members 51 and 52. The inner tubular member 51, which may be solid, if desired, is adapted to telescope within the outer tubular member 52 and has sufficient length relative to the length of the latter so that substantial portions of the two members are in telescoping relation at all times. The amount which the tubular members 51 and 52 may extend or move outwardly in their axial or longitudinal direction away from each other is not limited by the construction but the amount which they may contract or move inwardly toward each other is limited by providing within the inner end of the outer telescoping member 52 a stop block 53 against which the inner end of the inner telescoping member 51 is adapted to abut upon predetermined movement of the members 51 and 52. The inner and outer members 51 and 52 are provided at their outer ends with housings 54 and 55 which are adapted to receive the heads 56 and 57 of ball studs 58 and 59. The heads 56 and 57 are cushioned in the housings 54 and 55 by inserts 60 and 61 of resilient, rubber-like material. The pin portions or shanks of the studs 58 and 59 are received in tapered holes 62 and 63 of end attaching brackets 64 and 65 and are secured therein by nuts and washers 66 and 67. The one end bracket 64 is provided with a base flange 68 which is attached to the center web portion of a body side rail 10 by means of bolts 69 (or welding). The other end bracket 65 is provided with a base flange 70 which is attached to the top of the differential housing 15 by means of bolts 71. The other rod element 50 is attached in the same manner at one end to the differential housing 16 and at the other end to a frame member 10.

While the rod elements 50 are illustrated as extending transversely of the vehicle or substantially at right angles to the side frame rails 10 it may, in some installations, be desirable to have the rod elements extend in a diagonal direction relative to the side rail members 10.

The two rod elements 50 in the form of the suspension illustrated do not restrain the wheel supporting structure against sidewise movement relative to the vehicle frame when the vehicle is in operation with a properly distributed load and under normal road conditions. The resilient suspension members 31, the pins 38 and inserts 41, which are interposed between the vehicle frame and the wheel supporting structure, will absorb the vertical and horizontal stresses resulting from relative movement between the frame and the wheel structure and will hold such movement within limits which prevent contact between the portions of the frame and the members carried by the wheel structure which are closest to each other, as the frame 10 and the portion of the differential housing 21 which is indicated at 49 in Fig. 3 of the drawings. When due to unusual road conditions and/or unusual load the vehicle frame and wheel structure are subjected to stresses tending to cause excessive sidewise movement relative to each other, one or the other of the rod elements 50 will limit the extent of the movement in the direction which would cause contact between the frame and the portions of the differential housing which are in closest proximity thereto so that these members will not be damaged. The telescoping rod members 51 and 52 are so proportioned and the stop member 53 is so positioned relative to the end of the inner telescoping member 51 that the amount of movement of the members 51 and 52 in the direction to reduce the overall length of the rod element is less than the normal clearance distance between the channel 10 and the closest portion 49 of the differential housing 21.

While specific materials and particular details of construction have been referred to in illustrating the invention it will be understood that other materials and other details of construction may be resorted to within the spirit of the invention.

I claim:

In a resilient axle suspension for a vehicle having side frame members, an axle support means therefor, and driving structure having portions normally positioned in close lateral proximity to portions of said side frame members, said axle support means comprising longitudinally spaced pairs of axle housings and differential housings between the axle housings of each pair thereof, said axle housings being connected at their free outer ends to the ends of longitudinally extending walking beams, said walking beams being pivoted intermediate their ends on a cross shaft, said cross shaft being pivotally connected to saddle members depending from laterally spaced vehicle frame members and cushion members interposed between the side frame members and said saddle members which cushion members are adapted to absorb the stresses resulting from the weight of the load and from relative movement between the frame and the axle support means, a pair of rod elements, means including a ball and socket joint connecting one end of each of said rod elements to a vehicle side frame member at opposite sides of the vehicle, means including a ball and socket joint connecting each of said rod elements at the other end thereof to one of said differential housings, said rod elements each comprising a pair of elongate members having substantial portions thereof in telescoping relation, the rod members of each pair thereof being free to move relative to each other in a direction to extend the length of the rod element and a stop member between said rod members to limit the relative movement thereof in the opposite direction whereby one of said rod elements is effective to prevent sidewise movement of the axle support means relative to the vehicle side frame members beyond a predetermined point in one direction while the other one of said rod elements is effective to prevent sidewise movement beyond a predetermined point in the opposite direction so as to prevent contact of the driving structure with the frame members while permitting relative vertical movement thereof.

References Cited in the file of this patent

UNITED STATES PATENTS

| | | |
|---|---|---|
| 1,222,401 | Hess | Apr. 10, 1917 |
| 1,825,194 | Macrum | Sept. 29, 1931 |
| 1,970,859 | Lenze | Aug. 21, 1934 |
| 2,356,180 | Roos | Aug. 22, 1944 |
| 2,360,748 | Whisler | Oct. 17, 1944 |
| 2,409,507 | Mettetal | Oct. 15, 1946 |
| 2,689,136 | Hendrickson | Sept. 14, 1954 |
| 2,750,200 | Scheel | June 12, 1956 |
| 2,755,100 | Giacosa | July 17, 1956 |